(12) United States Patent
Atkinson et al.

(10) Patent No.: US 7,270,026 B2
(45) Date of Patent: Sep. 18, 2007

(54) DIFFERENTIAL ASSEMBLY

(75) Inventors: Aaron W. Atkinson, Royal Oak, MI (US); Joseph Palazzolo, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 244 days.

(21) Appl. No.: 10/435,852

(22) Filed: May 12, 2003

(65) Prior Publication Data
US 2004/0149062 A1 Aug. 5, 2004

Related U.S. Application Data

(60) Provisional application No. 60/443,830, filed on Jan. 30, 2003.

(51) Int. Cl.
*F16H 48/22* (2006.01)
(52) U.S. Cl. ............... 74/424; 475/230; 475/235
(58) Field of Classification Search ............. 74/424; 475/230, 235
See application file for complete search history.

(56) References Cited

U.S. PATENT DOCUMENTS

| | | | | |
|---|---|---|---|---|
| 2,821,096 | A | * 1/1958 | Lyeth, Jr. ................ | 475/235 |
| 2,932,218 | A | * 4/1960 | Russell ................... | 475/234 |
| 3,208,306 | A | 9/1965 | Lewis | |
| 3,365,983 | A | * 1/1968 | Jeakle .................... | 475/160 |
| 3,477,312 | A | 11/1969 | Duer | |
| 3,495,298 | A | * 2/1970 | Engle et al. ............ | 184/6.13 |
| 3,527,120 | A | 9/1970 | Duer et al. | |
| 3,624,717 | A | 11/1971 | Brubaker | |
| 3,853,022 | A | 12/1974 | Duer | |
| 3,874,250 | A | 4/1975 | Duer | |
| 3,896,684 | A | 7/1975 | Duer | |
| 4,513,635 | A | * 4/1985 | Takimura et al. ........ | 475/230 |
| 4,516,443 | A | * 5/1985 | Hamano et al. ......... | 475/160 |
| 5,045,038 | A | 9/1991 | Sherlock | |
| 5,055,095 | A | * 10/1991 | Osenbaugh et al. ..... | 475/233 |
| 5,741,199 | A | 4/1998 | Tanser et al. | |
| 6,027,279 | A | * 2/2000 | Skjaeveland ............ | 403/378 |
| 6,261,202 | B1 | * 7/2001 | Forrest et al. .......... | 475/235 |
| 6,470,988 | B1 | 10/2002 | Beesley | |

FOREIGN PATENT DOCUMENTS

JP 9-49557 * 2/1997

* cited by examiner

*Primary Examiner*—William C Joyce
(74) *Attorney, Agent, or Firm*—Fredrick Owens; MacMillan, Sobanski & Todd, LLC

(57) ABSTRACT

A differential having a differential case, a pair of side gears disposed in the differential case and a biasing element disposed between the side gears to force the side gears against the differential case, creating a torque bias between the side gears and the differential case. The torque bias may also include the torque bias between the biasing element and the side gears. In some embodiments, the differential may include washers disposed between the side gears and the differential case, so that the torque bias may be the sum of the bias created between the side gears and the biasing element, the side gears and the washer, and the washer and the differential case. In an alternative embodiment, the differential includes a pair of pinions rotatably engaging the side gears, wherein the biasing element applies a force to the pinion gears to create a torque bias on the pinion gears, thereby inhibiting the side gears from movement relative to each other until the pinion torque bias is overcome.

5 Claims, 6 Drawing Sheets

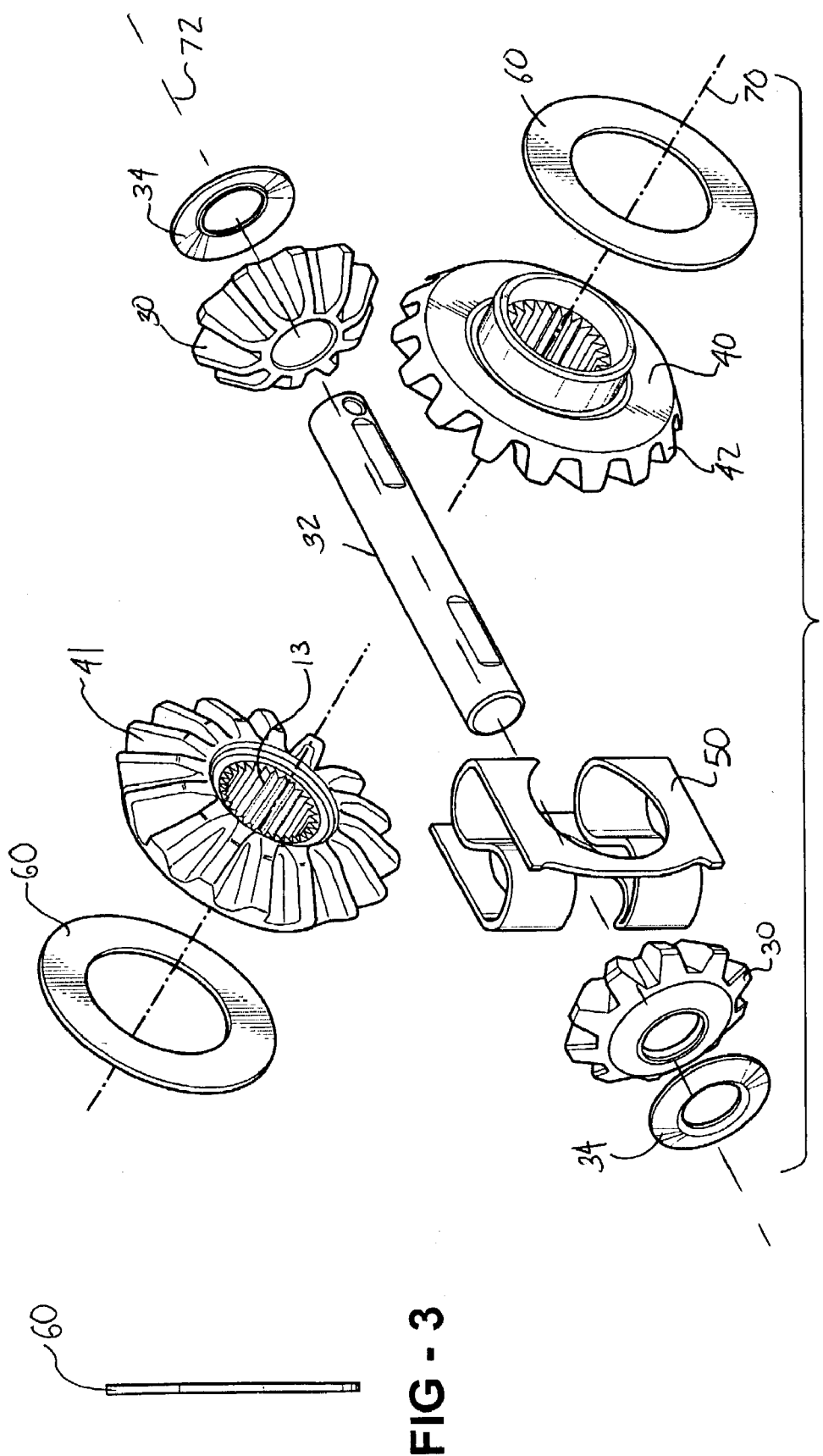

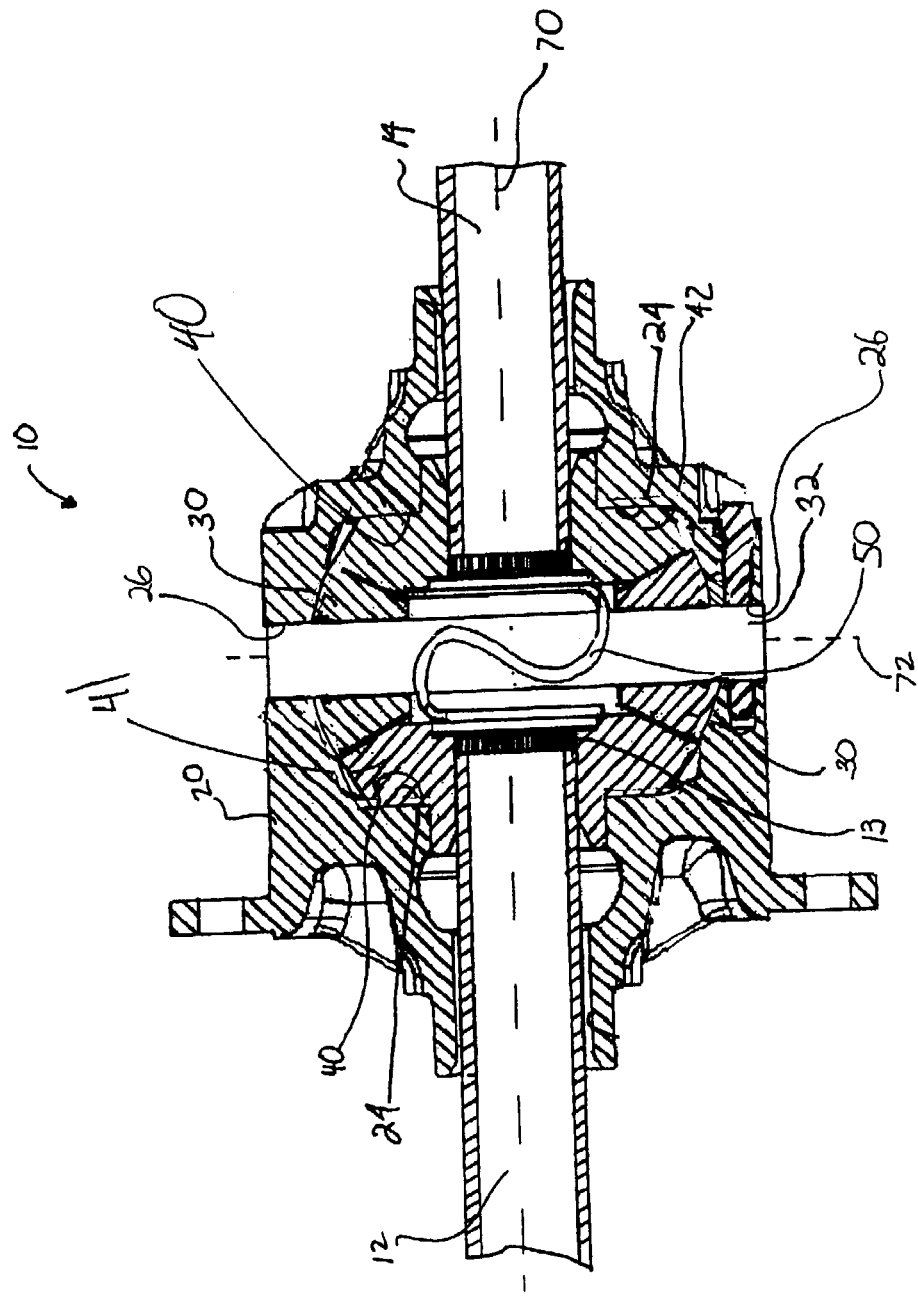

US 7,270,026 B2

DIFFERENTIAL ASSEMBLY

CROSS-REFERENCE TO RELATED APPLICATION

This application claims the benefit of U.S. Provisional Application No. 60/443,830, filed Jan. 30, 2003, the entire disclosure of which is hereby incorporated by reference and constitutes part of this application.

BACKGROUND OF THE INVENTION

The present invention relates to a differential assembly and more particularly to a lightweight differential having a biasing preload.

Differential assemblies are well known in the art and generally include open, limited slip, and locking differentials, the simplest of which is an open differential. An open differential transfers the same amount of torque to each wheel. In low traction situations, such as driving on ice, the amount of torque applied to the wheels without one of the wheels slipping is limited to the greatest amount of torque that may be applied to the wheel with the least amount of traction. A conventional open differential is shown in FIG. 1 and includes a differential case 20, which encases and locates the side gears 41 and 42 and pinions 30. A flat thrust washer 60 is disposed between each side gear and the differential case to prevent the side gear from engaging the differential case. The thrust washers 60 are typically machined to specific tolerances to prevent preload or torque biasing.

Limited slip differentials generally include the components of an open differential as well as a clutch pack and a biasing element, such as a spring. Elements of the clutch packs rotate with the side gears and the biasing element urges the side gears apart to create an initial torque bias within the clutch pack. This initial torque bias prevents the side gears from rotating relative to each other until the initial torque bias is overcome. The magnitude of the torque bias is a function of the force applied by the biasing element, the number of frictional surfaces in the clutch pack, area of the friction surfaces, and the friction coefficient of the friction surfaces. In low traction situations, limited slip differentials create a torque bias so that the maximum amount of torque that can be applied to each wheel, without causing relative rotation of the side gears, is the torque it takes to overpower the clutch pack rather than the maximum amount of torque the wheel with the least amount of traction can sustain without slipping. The clutch pack preload typically found in limited slip differentials is greater than 108 N-m.

Four-wheel-drive or all-wheel-drive vehicles typically include a constantly driven axle 4 and a selectively engageable axle 2 (FIG. 6). Engagement of the selectively engaged axle typically includes engaging a transfer case 80 and wheel hub locks 92 (FIG. 6). When engaged, the wheel hub locks 92 ensure that the wheels rotate with their associated shafts. When the selectively engageable axle 2 is not driven, the locks 92 are disengaged to permit the wheels to rotate relative to their associated axle shafts in order to improve fuel economy. A limited slip differential may be unnecessary or undesirable on the selectively engageable axle 2. For example, including a limited slip differential on a selectively engageable axle 2, typically the front axle, increases the vehicle cost and may adversely affect steering. Therefore, it is usually desirable to use an open differential on the selectively engaged axle. One problem with using an open differential with a selectively engaged axle is that while the wheel hub locks 92 and transfer case 80 are not engaged, the output half shafts 12 and 14 may be spinning at different speeds due to inherent frictional or drag force differences between each output half shaft. If the output half shafts are spinning at different speeds, noise, vibration, and harshness may occur from the gear mesh between the side gears 40 and pinions 30 as they rotate within the differential case 20. Different speeds of the half shafts 12 and 14 may also make it difficult to engage the wheel-end hub locks and may cause engagement clash, resulting in grinding, noise, vibration, or harshness issues as the wheel-end hub locks are engaged. Therefore, it is desirable to ensure that the differential side gears 40 and output shafts 12 and 14 are rotating at the same speed.

SUMMARY OF THE INVENTION

In view of the above, the present invention is generally directed to an open differential to which a biasing element is added between the side gears. The biasing element applies a force to the side gears, thereby inducing an initial bias torque so that the side gears are inhibited from rotation relative to each other until the initial torque bias is overcome. More specifically, the applied force creates a torque bias between the side gears and the biasing element, the side gears and the washer, and the washer and the differential case, the sum of which approximately equals the initial torque bias.

In some embodiments, the differential case may be assembled without the washers typically found in an open differential so that the force applied by the biasing element induces a torque bias between the biasing element and side gears as well as the side gears and differential case to create the initial torque bias. In other embodiments, the biasing element may apply a force to the pinions rotationally engaged with the side gears. The applied force on the pinions creates an initial torque bias on the pinions, similar to that described above in conjunction with the side gears, that due to the rotational engagement of the side gears with the pinions prevents the side gears from rotating relative to each other until the initial torque bias on the pinions is overcome.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 3 is a side view of the thrust washer shown in FIG. 2;

FIG. 4 is an exploded perspective view of the differential shown in FIG. 2;

FIG. 8 is a partial sectional view of a second alternative embodiment showing the differential assembled without thrust washers.

DETAILED DESCRIPTION OF THE PREFERRED EMBODIMENT

Figure 1:
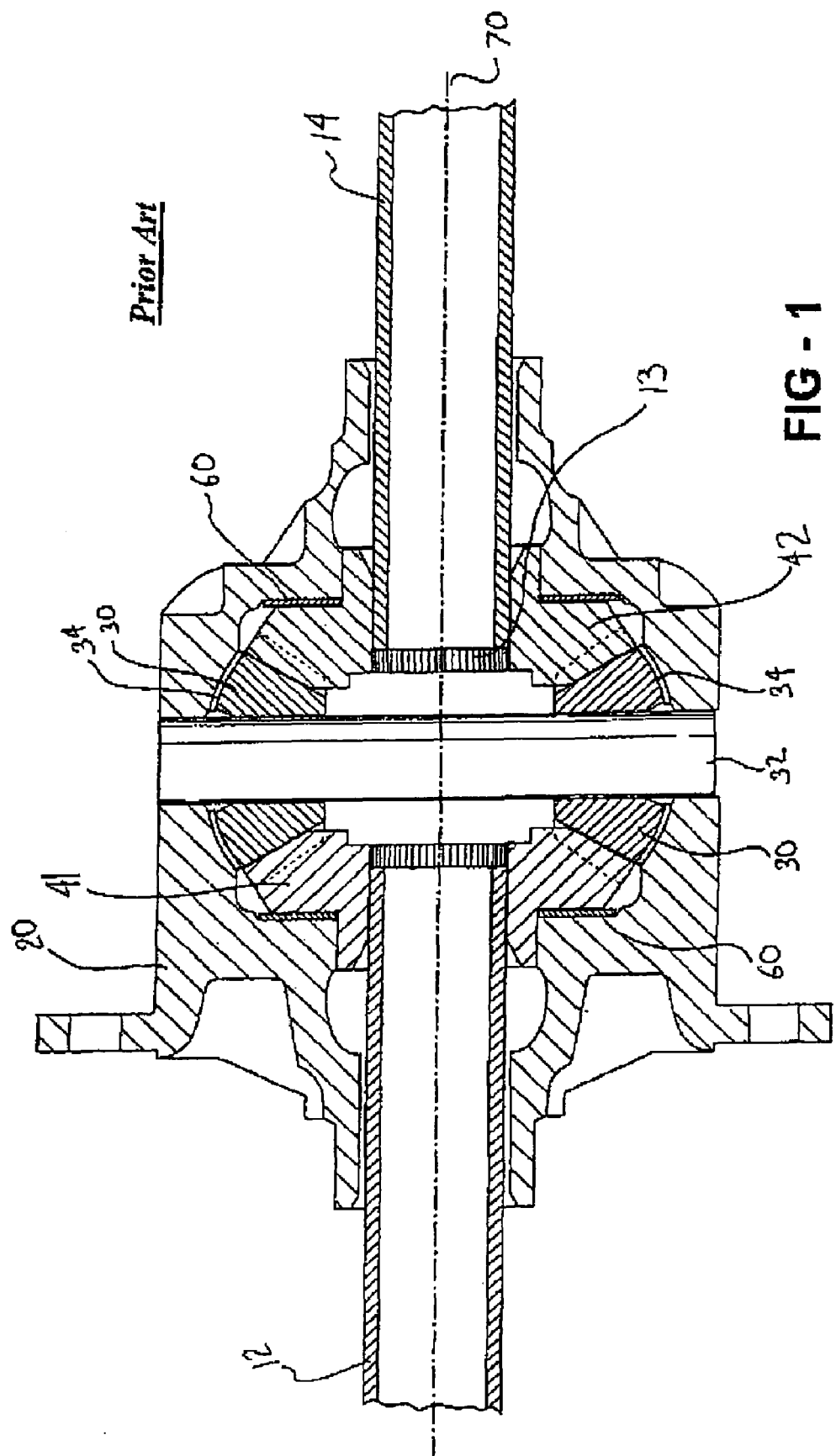
FIG. 1 is a partial sectional view of a prior art differential.
Figure 2:
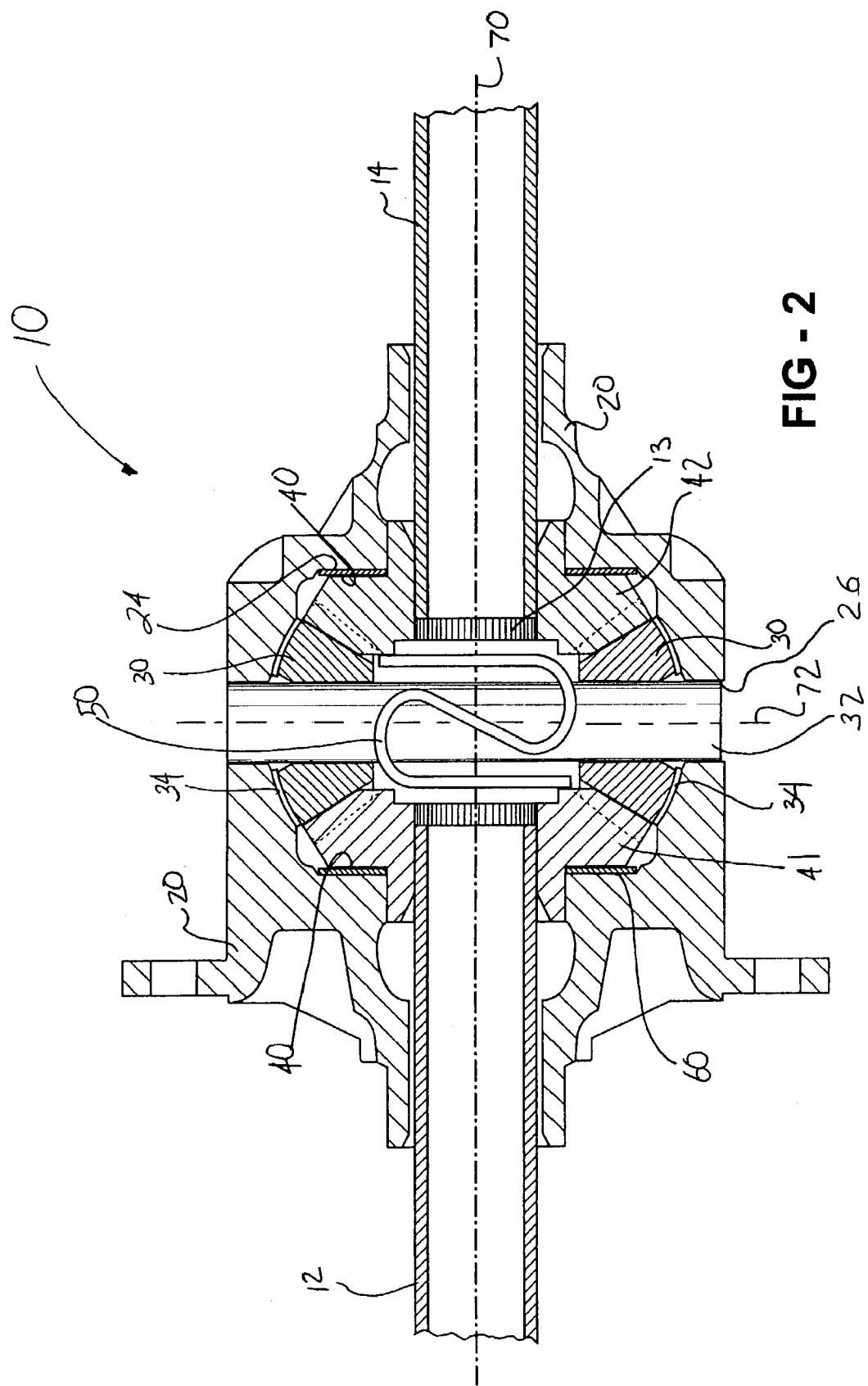
FIG. 2 is a partial sectional view of the differential assembly of the present invention.
Figure 5:
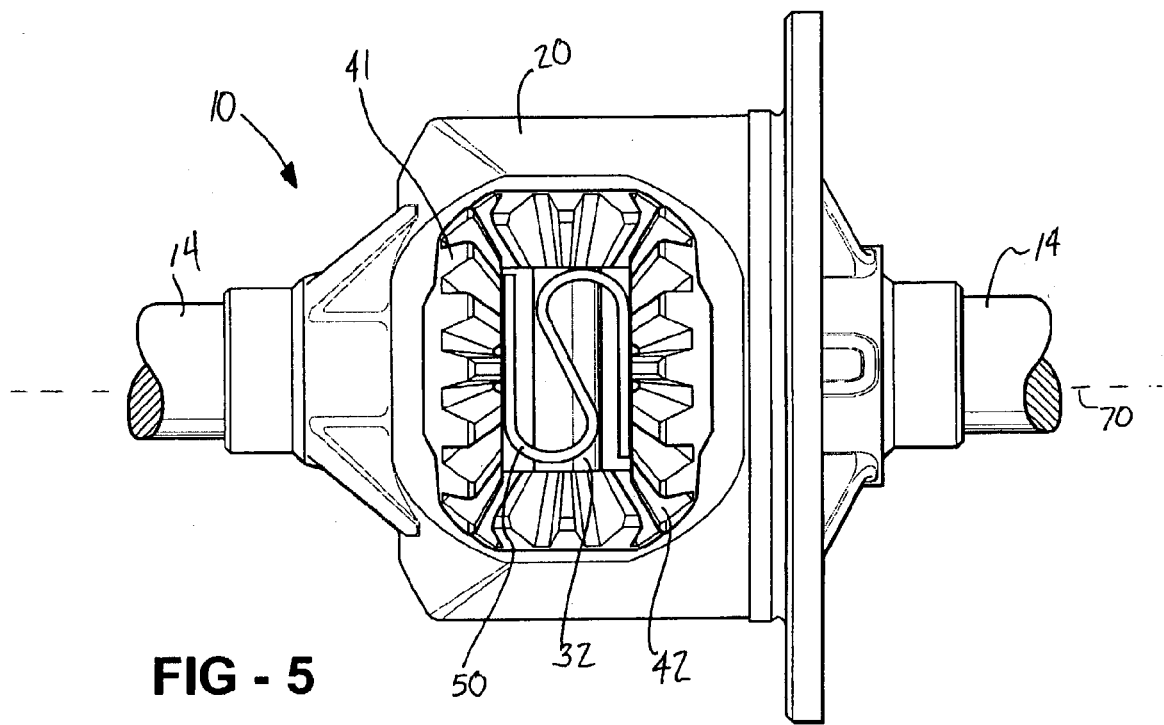
FIG. 5 is a side view of the differential shown in FIG. 2.

A differential 10 constructed in accordance with the illustrated embodiment is shown in FIG. 2. The differential 10 receives an input torque from a drive shaft 6 and transfers the torque to a first axle shaft 12 and a second axle shaft 14. More specifically, a differential case 20 is rotated about a differential axis 70 by the drive shaft 6. The torque is transferred from the differential case 20 to the output half shafts 12 and 14 by a pair of pinions 30 and a pair of side gears located within the differential case 20. As illustrated in FIG. 4, the side gears include a first side gear 41 coupled to the first half shaft 12 and a second side gear 42 coupled to the second output half shaft 14. The differential 10 also includes a biasing element 50 to urge the side gears 41, 42 against the differential case or against a washer 60 secured between the side gears and differential case, to create an initial torque bias that inhibits relative rotation between the side gears so that the output shafts 12 and 14 rotate in unison until the initial torque bias is overcome. A differential cover (not shown) may encase the differential case 20 to protect the differential 10 from environmental contamination.

Figure 6:
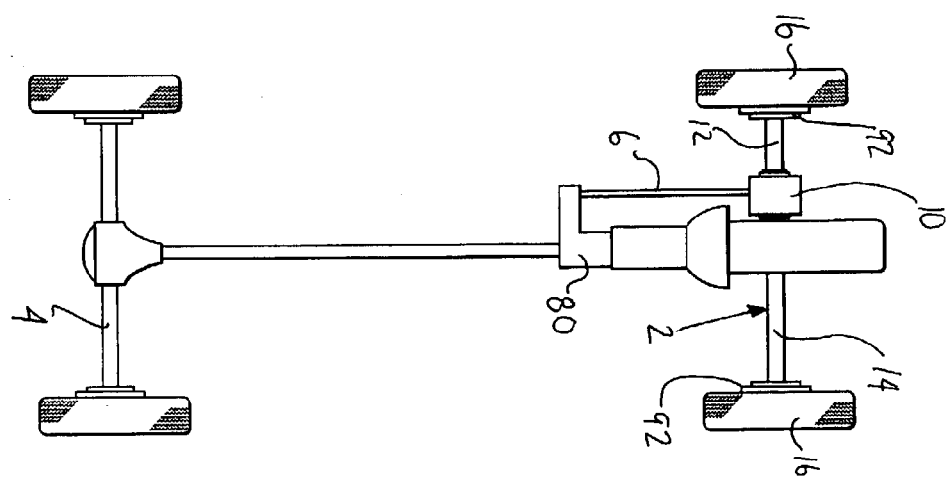
FIG. 6 is a schematic view of a vehicle drivetrain having a selectively engageable axle.

The differential 10 is described below as being installed on a vehicle having a driven axle 4 and a selectively engageable axle 2 (FIG. 6), but it should be readily recognized that the differential has broader applicability and may be used on any driven axle. For example, the differential 10 of the present invention is particularly well suited in applications where it is desirable, but not economically feasible to use a limited slip differential or in applications where an open differential is typically used, but a torque bias smaller than the torque bias typical in a limited slip differential is desirable.

The differential case 20 is similar to most open differential cases and generally includes a support surface 24, against which a washer 60 is assembled. The differential case 20 also defines holes 26 to receive and support a shaft 32 about which the pinion gears 30 rotate.

The side gears 41, 42 and pinions 30 are similar to those found in most open differentials and may vary in size and shape, depending upon the desired application. The side gears 41, 42 rotate about the differential axis 70, while the pinions 30 rotate about a pinion axis 72. The differential 10 is illustrated as having two pinions 30, although the configuration may vary so that more pinions may be used. The pinions 30 mesh with or engage the first side gear 41 and the second side gear 42 coupled to the first output half shaft 12 and the second output half shaft 14, respectively, so that as wheel speeds differ between opposing wheels 16 the pinions rotate about the pinion axis 72, allowing the side gears 41 and 42 to rotate relative to one another. A pinion washer 34 may be used to prevent the pinions from frictionally engaging the differential case 20. The pinions 30 and side gears 41, 42 are preferably, though not necessarily, formed out of steel and forged. It should be obvious to one skilled in the art that even though in the illustrated embodiment the pinions 30 are shown as being engaged upon a central shaft 32, they may be formed with their own individual shafts (not shown).

The side gears 41 and 42 may be formed as an integral part of the axle shafts 12 and 14 or may be attached to the axle shafts 12 by a variety of methods known in the art, such as a spline connection 13, illustrated in FIG. 4. The side gears 41 and 42 each include an axially outer annular surface 40 which engages the washer 60 retained between the differential case 20 and the side gears 41, 42. Alternatively, if a washer is not included in the assembly, the annular surface 40 directly engages the differential case 20.

The differential 10 includes a biasing element 50 that applies a force to induce an initial torque bias to inhibit rotation of the side gears 41 and 42 so that the side gears generally rotate in unison while the selectively engageable axle 2 (FIG. 6) is not engaged. By restraining the side gears 41, 42 against relative rotation, the biasing element 50 prevents rotation of the output shafts 12 and 14 relative to each other due to frictional or drag differences between the output shafts 12 and 14. The initial torque bias is caused by the biasing element 50 urging the side gears 41, 42 against the washer 60 which is supported by the support surface 24 on the differential case 20. More specifically, the initial bias torque is created from a variety of factors including the applied force by the biasing element, the number of contact surfaces, the friction coefficient of those contact surfaces and the surface area in contact. In some embodiments, the initial torque bias may be created without the washer so that the initial torque bias is approximately the sum of the torque bias from the direct engagement of the support surface 24 against the side gears 41 and 42 and the engagement of the side gears against the biasing element (FIG. 8). In the illustrated embodiment, the biasing element 50 is shown as a compressed spring placed between the side gears 41, 42. The spring may be an S shaped spring, a bevel spring, a coil spring, or any other biasing element that applies the necessary force on the side gears 41 and 42 to create the initial torque bias described above. In a vehicle with a selectively engageable axle, it is generally desirable to create an initial torque bias that is greater than the inherent drag in the drivetrain. By having an initial bias torque greater than the inherent drag in the drivetrain, the output half shafts 12 and 14 will generally rotate in unison, thereby reducing noise, vibration, and harshness issues as the selectively engageable axle 2 is engaged or from gear mesh while the selectively engageable axle is not engaged.

Therefore, the biasing element 50 is selected to apply enough force to the side gears 41 and 42 so that the output shafts 12 and 14 rotate in unison while the selectively engageable axle 2 is not engaged.

It is also generally desirable in a vehicle with a selectively engageable axle to provide less bias torque than typically provided by a limited slip differential. The initial bias torque may vary from application to application, but in the illustrated embodiment, generally has an initial torque bias less than 50 N-m, typically a range of about 3.4 N-m to about 45.2 N-m, and in the preferred embodiment has a range of about 4.5 N-m to about 39.5 N-m.

Figure 7:
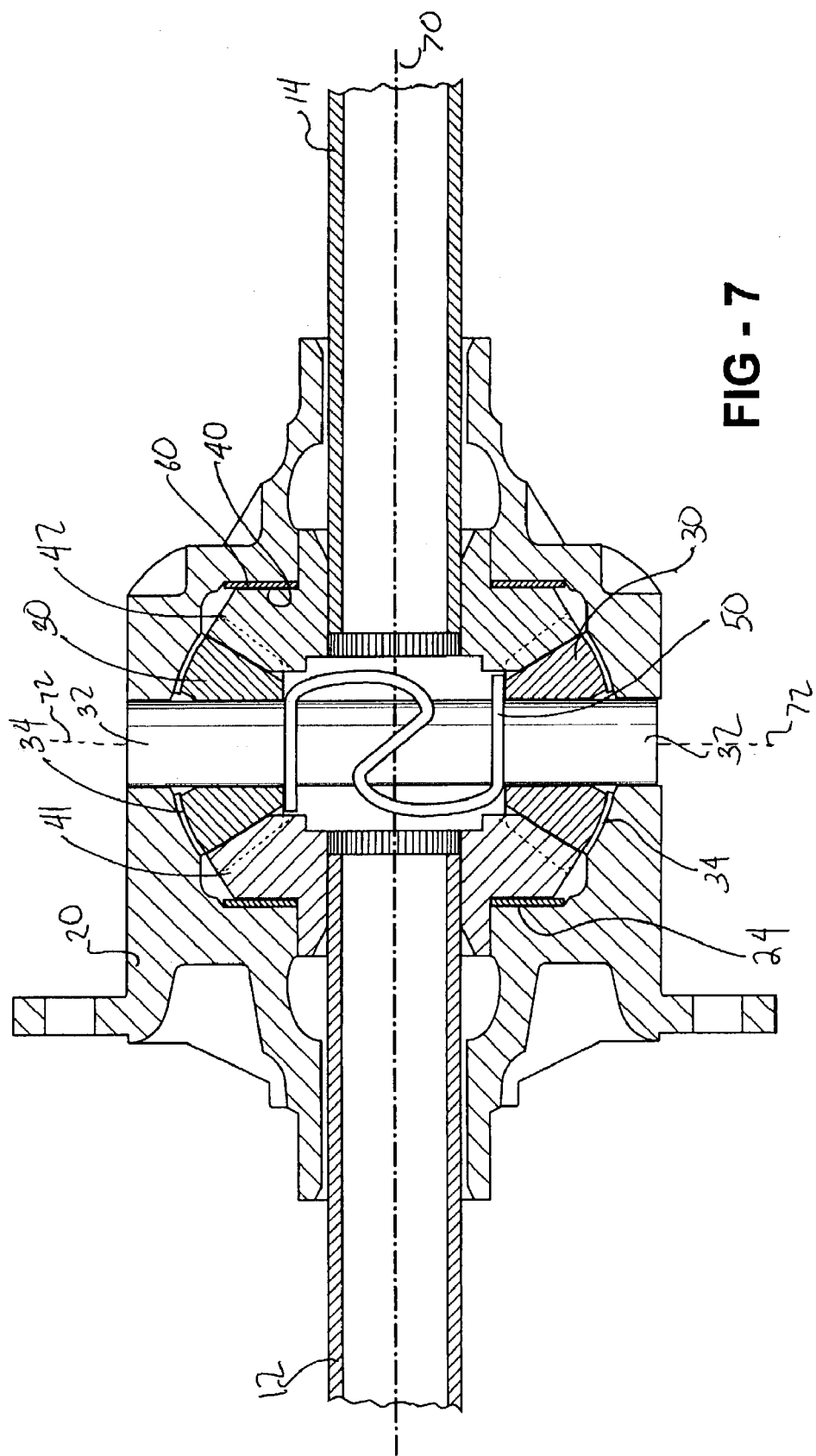
FIG. 7 is a partial sectional view of an alternative embodiment showing the biasing element engaging the pinion gears.

Even though the above invention has been described as applying a force to the side gears 41, 42 to create the initial bias torque, it should be readily recognized by one skilled in the art that due to the rotational engagement of the pinion gears 30 with the side gears, that the biasing element may apply a force to the pinions to create the same biasing torque effect that prevents the side gears 41 and 42 from rotating relative to each other. A representative illustration of which is shown in FIG. 7. One will also recognize that, as shown in FIG. 8, this bias torque may be created from the engagement between the pinions 30, pinion washer 34 and differential case 20 or the pinions 30 directly against the differential case.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A differential comprising:
   a differential case;
   a first side gear and a second side gear rotatably disposed within said differential case;
   a first flat washer disposed between and in direct contact with said differential case and said first side gear;
   a second washer disposed between and in direct contact with said differential case and said second side gear; and
   an elastic biasing element including axially spaced legs disposed between said side gears, each leg of said biasing element resiliently forcing each of said side gears axially apart and toward said washer and differential case to create a torque bias between said side gears and said differential case.

2. The differential of claim 1 wherein said biasing element creates a torque bias between said biasing element and said side gears.

3. The differential of claim 2 wherein the sum of the torque bias between said biasing element and said side gears and said side gears and said differential case is less than 50 N-m.

4. A differential comprising:
   a differential case;
   a pair of side gears rotatably disposed within said differential case;
   flat washers, each washer disposed between said differential case and each of said side gears and wherein said washers are free to rotate relative to said differential case and said side gears; and
   an elastic biasing element disposed between and resiliently contacting said side gears, said biasing element resiliently forcing each of said side gears mutually apart and toward a washer and said differential case to create a torque bias between said side gears and said differential case.

5. The differential of claim 4 wherein the sum of the torque bias between said biasing element and said side gears and said side gears and said differential case is less than 50 N-m.

* * * * *